United States Patent [19]
Divecha

[11] 3,828,417
[45] Aug. 13, 1974

[54] METHOD FOR FABRICATING COMPOSITE MATERIAL REINFORCED BY UNIFORMALY SPACED FILAMENTS

[75] Inventor: Amarnath P. Divecha, Falls Church, Va.

[73] Assignee: Commonwealth Scientific Corportion, Alexandria, Va.

[22] Filed: Oct. 22, 1971

[21] Appl. No.: 191,881

Related U.S. Application Data

[63] Continuation-in-part of Ser. No. 67,193, Aug. 26, 1970, abandoned.

[52] U.S. Cl............... 29/419, 29/195 G, 29/471.1, 29/473.4, 29/474.3, 118/44, 156/185, 228/5, 228/3;4;5
[51] Int. Cl............................................. B23p 17/00
[58] Field of Search.......... 29/19 SG, 419 G, 419 R, 29/271.1, 472.3, 473.3, 474.3; 113/1 N, 116 Y; 118/44; 156/182, 185

[56] References Cited
UNITED STATES PATENTS

| | | | |
|---|---|---|---|
| 3,029,496 | 4/1962 | Levi | 29/599 UX |
| 3,443,305 | 5/1969 | Matsuda et al. | 228/5 X |
| 3,609,855 | 10/1971 | Schmidt | 29/471.1 |
| 3,618,205 | 11/1971 | Barber et al. | 29/419 X |
| 3,625,662 | 12/1971 | Roberts et al. | 29/599 X |

Primary Examiner—Charles W. Lanham
Assistant Examiner—D. C. Reiley, III
Attorney, Agent, or Firm—Cushman, Darby & Cushman

[57] ABSTRACT

A method and apparatus for producing a composite material of the type having a number of filaments of one material separated by and bonded to a matrix of another material. As discussed below each of a number of filaments are wound with a number of turns of wire or foil which is made of the matrix material and these wound filaments are then consolidated by any suitable means, e.g. hot pressing, or drawing through rolls or properly shaped dies to produce a member from the composite material.

16 Claims, 8 Drawing Figures

INVENTOR
AMARNATH P. DIVECHA

BY Cushman, Darby & Cushman
ATTORNEYS

INVENTOR
AMARNATH P. DIVECHA
BY
Cushman, Darby & Cushman
ATTORNEY

METHOD FOR FABRICATING COMPOSITE MATERIAL REINFORCED BY UNIFORMALY SPACED FILAMENTS

This application is a continuation-in-part of Ser. No. 67,193, filed Aug. 26, 1970 (now abandoned).

BRIEF DESCRIPTION OF THE PRIOR ART AND SUMMARY OF THE INVENTION

The invention relates to a method and apparatus for fabricating a continuous filament reinforced composite material.

Structural filamentary composite materials are materials which consist of two or more discrete physical phases, usually including a fibrous or filament phase dispersed within a matrix phase so that the fibrous phase retains its physical identity. Metal matrix composites in particular have been used for a variety of applications at temperatures ranging from cryogenic to 6,000°F and above, and in general offer high modulus and high strength in reinforced directions, the ability to be joined by brazing or welding and greater fracture toughness compared with the more easily fabricated resin matrix composites. Moreover, the primary advantage of all composites, including the metal matrix type, is the ability to offer the user a tailor made material with properties selected particularly for a given application. As such they have been used widely in aerospace projects with a variety of different materials making up composites.

Many techniques for composite fabrication have been developed and are in use today. These include not pressing techniques, electrodeposition, chemical vapor deposition, spark sintering, drawing filament arrays through a molten metal bath, roll diffusion bonding by a seam welder, high energy rate forming and plasma spraying. While these techniques do produce composites which are satisfactory, the results are frequently characterized by lack of reproducibility in the performance of the composite and by an expense which severely limits the practicality of their use for most applications.

In one hot pressing technique, a number of alternate layers of a grooved matrix foil and separated filaments disposed in the grooves are pressed together under high pressure to generate the composite. However, this process is lengthy and requires expensive equipment to generate the necessary pressures and temperatures. Further, filament-to-filament contacts which substantially alter the desired properties of the composite material occur frequently and are difficult to eliminate. Grooving the matrix foil and properly positioning the filaments in the grooves in difficult and time consuming at best.

Electrodeposition also has drawbacks as a technique, particularly with materials such as diethylhydride aluminum which require elaborate safety precautions to deposit aluminum. Also, the electrodeposition generally, uniformity in the matrix deposit on the filaments is difficult to achieve and maintain along the entire filament length. In the case of nickel and other similar materials, contaminants from the bath and thickness control pose serious problems. In this instance, phosphorous and sulphur in the electrodeposited nickel frequently embrittle the metal and lower the melting point of the nickel, thus drastically altering the characteristics of the composite material.

In addition to all these drawbacks, electrodeposition is generally limited to elemental materials rather than alloys. Thus, the special properties imparted to a metal by alloying cannot be utilized in the composite. One typical example is 6061 Aluminum alloy which is very desirable in a matrix because of its weldability which is superior to that of pure aluminum. Electrodeposition of 6061, however, is prohibitively expensive and difficult.

Spark sintering is a versatile process for coating the separated filaments with the matrix material which fills the space between them but this technique requires many points of contact to increase the resistance to the passage of high current. The filament-grooved matrix foil lay up which is used in the above mentioned hot pressing technique can be adequately consolidated by this process but the high conductivity of the metal matrix foil, the few contact points and the size of the composite that can be fabricated make this process unattractive for many applications. However, cold pressed mixtures of powdered dissimilar materials, metal/ceramic and ceramic/ceramic slugs can be compacted to theoretical volumes by this method due to the very high resistance resulting from numerous contact points between the fine particles.

Drawing an array of filaments through a molten matrix bath is severely limited for most combinations by chemical compatibility between the two components. In fact, the only composite for which this technique is now truly satisfactory is believed to be that of Mg/B. Even when more stable filamentray materials become available, control of the temperature of the bath, filament twist in the bundle, atmosphere control to prevent oxidation and handling of the array of encapsulated filaments emerging from the molten bath pose difficult problems which render this technique generally undesirable and relatively expensive.

One roll diffusion bonding technique is essentially similar to hot pressing in that thin grooved metallic foil filaments are usually employed as the starting material. The problem of filament-to-filament contact can be relieved to a significant degree in this technique in that the number of filaments and layers is usually reduced and filament spacing in the composite is good. However, filament fractures during passage between the rolls where the high current and pressure are applied to the filament matrix array present a difficult problem. Up scaling of the process is also difficult because of the power limitations and accordingly tapes of a thickness of roughly 0.012 inches and a ½ inch width are perhaps the largest practical size which can be currently produced by this technique.

Plasma spraying is an approach in which the filament material is added to a grooved matrix in powdered form. However, the spray tends to cause severe oxidation of the starting, highly oxidized atomized power and compaction is frequently poor due to the lack of sintering of the oxide/oxide contacts.

In addition, certain other techniques exist for forming a composite material, which utilize traditional metal-forming through a die. For example in the Patent to Graze, No. 3,131,469 issued May 5, 1964, the consolidated wire is produced by drawing a number of individual strands of wire which are separated from one another by a plurality of small wires of brazing material through a die which causes the brazing material to spread out and form a matrix following the filaments.

In an alternate embodiment, Graze shows the disposition of sleeves of matrix material upon the filaments prior to the drawing step. A similar technique is disclosed in the Patent to Weber et al., No. 3,277,564, in which elongated filaments are sheaved in separate material to form a filament bundle which can then be packed through a die for consolidation. In the first place, these later techniques suffer from the same defect discussed above, namely, it is impossible to assure separation of filaments from one another. Furthermore, it is difficult to prevent shifting between the filaments during the drawing step. Therefore, it is impossible to assure a uniform product when utilizing this method. Furthermore, it is often desirable to utilize members having shapes other than that of wire or rod and there is no teaching in the Graze or Weber et al. patents of forming members of composite material having other cross-sections than that of a wire or rod.

The present invention relates to a method and apparatus, as well as a composite material, which involves winding a matrix foil or wire of a predetermined thickness and/or width onto a given reinforcing filament. A number of such wound filaments can then be pressed together or otherwise consolidated at a high temperature to produce the composite material.

With this technique, it has been discovered that filament-to-filament contact is highly improbable during consolidation and accordingly the composite materials have a high reproducibility of characteristics and at the same time can be made relatively inexpensively and quickly. Further, the filament diameter and length may be varied at will for any given application and desired characteristics. Thus the percentage of each of the materials in the composite can be easily varied by changing the matrix foil or wire dimensions as well as the filament dimension. In fact, the matrix foil or wire dimensions may be chosen to give a composite containing a volume of filament up to 0.70 without substantial filament-to-filament contact.

Further, this novel technique and apparatus is applicable to many different combinations of materials so that the technique and apparatus can be used generally rather than for just one or a few combinations. In particular, a ductile filament-ductile matrix combination such as Al/Be, Ti/Be, Al/Steel or Cu/W can be easily produced by using larger (e.g. 0.150 inches) diameter filaments. Such matrix combination can then be converted into 'billets' by spark sintering, hot pressing or any other suitable process and can then be hot worked into structural shapes such as I, H, Tee, beams channels; tubes, etc. by rolling, extrusion or swaging. Filament cross section may be reduced and converted to rectangular or ellipsoidal shape if desired so that the finished composite assumes the form of a system comprising ribbon reinforced metal composite. The transverse strength of such a composite is enhanced considerably depending upon the aspect ratio or width thickness ration of the in situ flattened filament. Furhter, standard weaving, warping and other similar techniques can be directly employed with composites to generate mats, plys etc.

The versatility of the apparatus and method of this invention is important since both wire wound filament arrays or foil wound filament arrays can be easily consolidated by hot pressing, hot working, electrodeposition, diffusion bonding, chemical vapor depositions, spark sintering, seam weld-diffusion-roll bonding etc. in contrast with other techniques which cannot be effectively consolidated so easily and in so many different ways. Further, the process and apparatus of this invention is considerably cheaper and much simpler than those processes and apparatus now in use for making composite materials.

The present invention further contemplates a continuous process for fabricating metallic matrix composite shapes. In this process, matrix is formed by cladding a plurality of filaments of a first material in a second material as, for example, by the above described method, bundling a plurality of clad filaments into a hexagonially closed packed configuration in which the filaments are embedded in a matrix formed by the second material, inserting this closely packed configuration into a tube formed of material identical to that of the cladding to form a preform, drawing the preform through a first die to lock the tube to the matrix formed by the cladding and force out air thus preventing random filament movement, and drawing the perform through successively smaller dies. This method, in contrast to the methods outlined above, and especially to those disclosed in the patent to Glaze and Weber et al., produces in a continuous process matrix composite shape having uniform mechanical properties.

Furthermore, the applicant's invention contemplates the production of composite shapes other than a rod or wire shape by the use of forming rolls instead of a die to make Z, hat and other shapes of composite products.

Many other objects and purposes of the invention will become clear from the following detailed description of the drawings.

BRIEF DESCRIPTION OF THE DRAWINGS

FIG. 9 is a detailed view illustrating one type of bonding station shown as reference numeral 26 in FIG. 1.

FIG. 9A is a partial sectional detail view of an element of FIG. 9 along the line A—A in FIG. 9.

FIG. 10 discloses a level winding machine for the production of rolls of mats comprised of clad filaments.

FIG. 11 schematically discloses a detail cross view of the take-up spool shown in FIG. 10.

FIG. 12 shows a collimating device for producing multi-layer clad filament-tape used in producing composite members.

FIG. 13 is a schematic presentation of an apparatus used in producing a composite material member.

FIG. 14 is a detailed sectional view taken along the line B—B in FIG. 13.

FIG. 15 is a Figure corresponding to FIG. 13 by showing a second embodiment of the applicant's invention for forming tubular composite.

FIG. 16 is a sectional view taken along the line C—C in FIG. 15.

FIG. 17 is a view similar to FIG. 14 but showing a third embodiment of the applicant's apparatus.

DETAILED DESCRIPTION OF THE DRAWINGS

Figure 1:
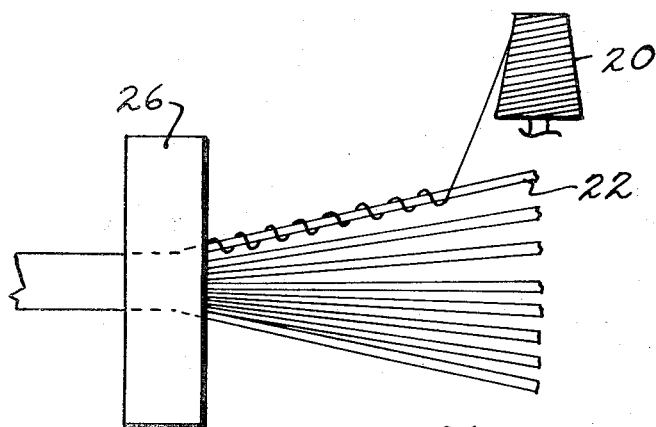
FIG. 1 shows a number of filaments being wound with a matrix foil or wire and being consolidated at a hot forming die or bonding station into the composite material.

Reference is now made to FIG. 1 which shows schematically an arrangement for winding matrix foil or wire onto filaments. As mentioned briefly above, the novel method and apparatus of this application involve winding a matrix wire or foil of suitable material onto a reinforcement filament of different material. A number of such wound filaments can then be grouped in an array and bonded together by any suitable method to generate a piece of composite material. As with metals and alloys generally, the composite can then be shaped as desired by hot or cold working. The composite material fabricated in this fashion further has excellent reproducibility, virtually no filament-to-filament contact and can be produced simply and inexpensively.

FIG. 1 schematically illustrates this process and as shown in that Figure, matrix wire or foil from the suitable coil 20 is continuously wrapped about a reinforcing filament 22 of a different material so that there are no gaps in the wrap or that the spacing between each successive turn is equal about filament 22. Preferably, the matrix is wound on filaments at an elevated temperature, e.g. filaments emerging from the filament making machine or deposition apparatus. Thus the matrix is heated while being wound so that, upon cooling, it normally shrinks more than the filament because of its greater coefficient of expansion, thereby preventing unwinding of the matrix during hot pressing.

A number of such wound filaments are then grouped together in an array as shown and passed through a bonding station indicated generally at 26 to produce the composite material. When the closely spaced wire wound filament array is employed, there is not particular need for precisely positioning each wound filament. On the other hand, wound filaments containing equally spaced matrix foil or wire can be employed by grouping the wound filaments so that the matrix of one can act as a filler for an adjacent filament as well. The volume percentages of the filament can in this way be easily raised as high as 85 percent.

Either of these grouped arrays, close wound without gaps or controlled spacing, can then be passed through a bonding station indicated generally at 26 to produce the composite material. The bonding station can be a hot forming die, an electrodeposition apparatus or any suitable arrangement for bonding the array together.

Figure 2:
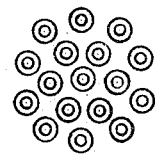
FIG. 2 shows a cross-sectional view of an array of wound filaments before bonding.
Figure 3:
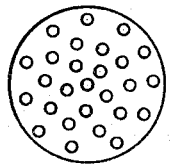
FIG. 3 shows a cross-sectional view of the consolidated material.

A cross-sectional view of a number of wound filaments comprising an array shown in FIG. 2 and similar cross section of the consolidated composite which results from passing this array through a bonding station is shown in FIG. 3. The matrix material can be wound on the filaments by hand if desired, although it is contemplated that relatively simple machines can be best employed for this purpose.

Figure 4:
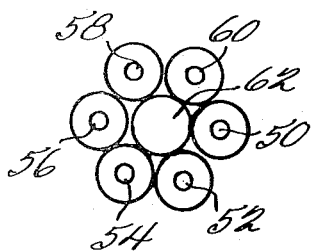
FIG. 4 shows an array of wound and unwound filaments.

Different sizes and types of wound filaments can be combined together in many different configurations to produce composites having different sets of properties and the invention of this application is not intended to be limited to any particular configuration, such as the one shown in FIG. 2. For example, FIG. 4 illustrates an array of filaments before pressing in which a number of wound filaments 50, 52, 54, 56, 58 and 60 surround an unwound filament 62 which is depicted as being of substantially greater diameter than the wound filaments. It will, of course, be understood that the diameters of the various filaments can be varied as desired. The matrix material wound about filaments 50, 52, 54, 56, 58 and 60 serves to separate these filaments from each other as well as from unwound filament 62. A configuration as depicted in FIG. 4 can also be employed to practically and economically increase the percentage of the filament by volume in the composite.

Figure 5:
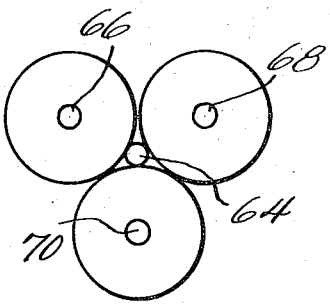
FIG. 5 shows an array of filaments with an unwound filament filling the void between would filaments.

FIG. 5 illustrates a further embodiment of the invention wherein an unwound filament 64 is employed to fill the open space between wound filaments 66, 68 and 70, again permitting the filament as a percentage of the composite to be simply and economically increased. The matrix material wound about filaments 66, 68 and 70 separates these filaments from each other as well as from wound filament 64.

Figure 6:
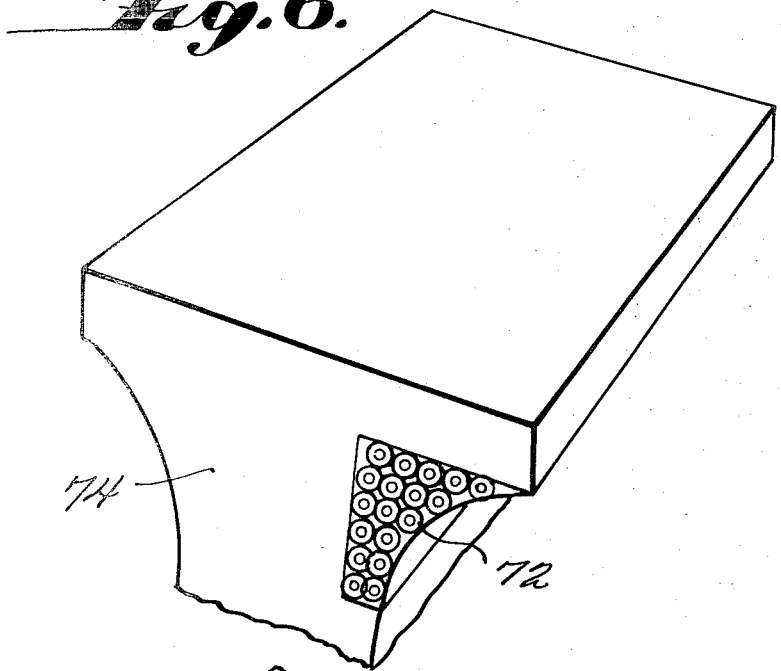
FIG. 6 shows a structural member with a section comprised of composite material.

It is not necessary that any given member be entirely constructed of a composite material, for example, a portion of a member which must withstand greater stress than the remainder of the elements can be fabricated of composite material, and then bonded to a normal unreinforced alloy or metal. For example, in FIG. 6 area 72 of member 74 is shown comprised of consolidated wire wound filaments which serve to reinforce section 72. If desired, the remainder of member 74 may be constructed of the same material as the matrix material which separates the filaments in section 72.

Figure 7:
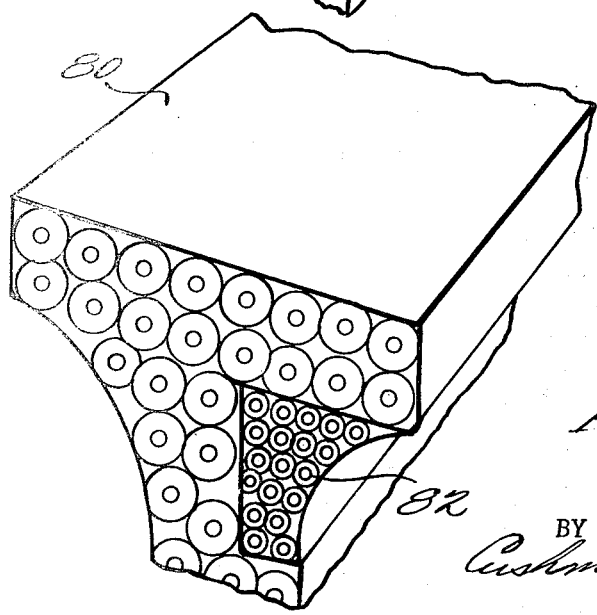
FIG. 7 shows a structural member with two composite materials.

Further, it is not necessary that a member be constructed in its entirety of the same composite material. It may be desirable for many applications to vary the percentage of filament volume to tailor the composite properties to the particular application. For example, in FIG. 7 a member 80 includes a section 82 in which the percentage of filaments by volume varies markedly from the percentage in the remainder of the element.

One composite system which was fabricated in this way employed 60/40 tin/lead solid wire as the matrix material and this wire had a diameter of roughly 0.032 inches. A single filament of copper wires roughly 0.102 inches in diameter was then hand wound with the lead wire. The wire wound filament was then sectioned in equal lengths and placed in a die cavity 1 inch by 4 inch and hot pressed at approximately 135°C under a pressure of 2,000 psi for one-half hour. Although the consolidation was not complete, the filament array and spacing were nearly perfect which is especially significant since no attempt was made to position the wire wound filaments precisely in the die. The lack of complete consolidation was believed to be due primarily to contamination from hand wiring and the relatively low pressing pressures. However, over the majority of the composite cross section, diffusion between matrix/matrix and matrix/filament contact points was satisfactory. It was established in a subsequent experiment described below that by eliminating the contamination from handling the matrix and applying higher pressures and temperatures a most satisfactory composite, such as a tube, can be produced.

In this further experiment the winding procedure was accomplished in a fashion similar to that described above for the lead-copper composite. A copper matrix wire having a diameter of 0.013 inches was wound on to a steel piano wire of 0.040 inches, and this combination employed for the fabrication of a circumferentially oriented composite tube as follows.

A steel core one-half inch in diameter was next wrapped with a thin copper foil roughly 0.005 inches thick. The wire wound filament was then carefully wound about the steel core in much the same manner as copper inducation coils are prepared. Two more layers were then wrapped over the initial layer to achieve close packing and the entire assembly consisting of the wire wound filaments on the core was placed in a cylindrical die and consolidated. The pressing pressure was of the order of 10,000 psi. The temperature of roughly 585°C. and a pressing time of 2 hours were sufficient to fully consolidate the structure.

A number of materials can be used to generate different matrix filament combination and the following table lists a few such combinations. This table is by no means exhaustive and this technique can be used to generate many other different combinations as may be required or desired.

TABLE

| MATRIX | FILAMENT |
| --- | --- |
| 1. Al and wrought aluminum alloys | Be, W, Mo, Steel, B, SiC, TiB$_2$, Borsic and Al$_2$O$_3$ |
| 2. Ti and wrought titanium alloys | Same as above except for W |
| 3. Magnesium and wrought magnesium alloys | Same as No. 2 |
| 4. Nickel and wrought nickel alloys including super alloys | Al$_2$O$_3$, and other stable, oxide filaments which may be developed in the future |
| 5. Chromium and wrought chromium alloys | Same as No. 4 |
| 6. Iron and wrought iron alloys (including steel) | Same as No. 4 |
| 7. Columbium and wrought columbium alloys | Tantalum and tungsten |
| 8. Dispersion strengthened alloy, e.g. thorium dispersed nickel | Suitable filament |
| 9. Suitable matrix | Dispersion strengthened alloy, e.g. thorium dispersed tungstun |

The invention of course is not limited to a composite with just one matrix material and a different filament material. Many different filament materials and/or matrix materials can be employed in a single composite to tailor the properties of the composite as desired. For example, a first matrix might be wound on a filament and a second matrix then wound atop the first matrix. Two types of filaments might be used. Many other variations should be readily apparent.

Figure 8:
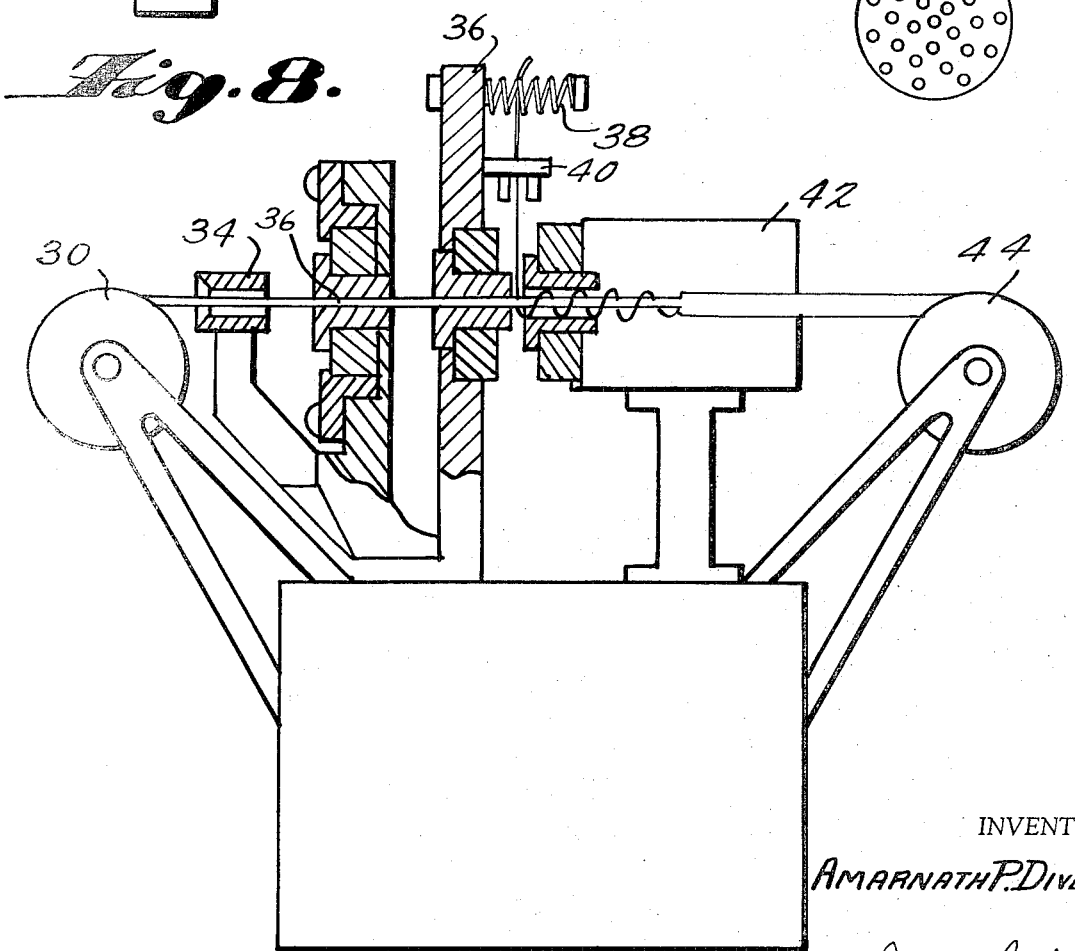
FIG. 8 shows a machine suitable for winding wire or foil onto filaments.

FIG. 8 shows a simple device which can be used to wind wire or foil onto a filament which can then be grouped with a number of other filaments in an array and consolidated by any suitable method. In this arrangement a filament from coil 30 passes through a tension adjuster 32 and then through a variable aperture 34. A check plate 36 rotates about the filament as it continually moves through the device and check plate 36 carries on it a roll of matrix or foil 38 which is thus wound about the filament passing through the device via tensioning device 40. The wound filament moves out of the device through an output tube 42 and is wound on a second roller 44. Since precise positioning, foil grooving, matrix thickness control, safety precautions, spray equipment etc. are not required for this simple winding machine it can be constructed at a cost which is considerably less than the machines required in the other processes mentioned above. Furthermore, the versatility of the winding operation in the preparation of various matrix/filament combinations, simple control of the volume percentage of the filament in the composition by variation in either foil or filament dimensions or both, automatic winding without constant supervision, low probability of filament/filament contact, and automatic close packed spacing in consolidated composites cannot be readily achieved by the other above mentioned processes.

As mentioned briefly above, arrays of foil or wire wound filaments can be easily consolidated by any appropraite method including spark sintering, plasma sprying, bonding, hot pressing, high energy rate forming and even electrodeposition and chemical vapor deposition. The filaments may be of any desirable cross sectional shape, e.g. rectangular, as is desirable for producing a desired set of properties in the composite. A filament particularly with one cross sectional dimension substantially greater than the other results in the composite having greater strength in some directions than in others and this may be desirable for many applications. Filaments can even be flattened before or after winding if desired.

Another important aspect of the foil or wire wound filament and wire wound filament technique of this invention is that consolidated arrays can be worked into a variety of shapes by conventional metal working processes. If desired, foil and wire wound filaments can be woven into any appropriate pattern before consolidation. Thus, it is not necessary to develop new and expensive equipment to work with and form the consolidated materials and existing rolling, extrusion and swaging machines, suitably modified, can be efficiently employed in the production of composites of various sizes and shapes as discussed above.

Turning now to the applicant's apparatus and method for producing continuous matrix composite the bonding station 26 indicated generally in FIG. 1 is demonstrated in detail in FIG. 9.

Thus, referring to FIG. 9, it is seen that plurality of filaments 22 of Boron about which coils 20 of Aluminum Alloy are wrapped in the manner described above, are first passed through a surface treatment station 46. Surface treatment of the foil or matrix material is especially important if the aluminum-aluminum-contact is resisted by the stable oxide film which adheres to aluminum. Thus, surface treatment station 46 includes a solvent cleaning stage and treatment such as wire brushing, zincating or silver coating, which augments the complete fusion between aluminum portions during the subsequent steps. Of course, surface treatment may not be necessary for matrix materials other than Al. Filaments 22 and their cleaned aluminum coils are then drawn through a bundling device 48 which produces a close hexagonally packed matrix as indicated by numeral 50 comprising an Aluminum-clad Boron filament bundle. next the Aluminum-clad filament bundle is inserted within tubing 52 which is comprised of the same material as the matrix or cladding of the filament bundle; in the preferred embodiment the tube may be formed from 6061 Aluminum Alloy. The tubing 52 is next drawn through a pair of preforming dies at room temperature wherein the second die orifice has a smaller diameter than the first orifice. This preforming step generates a preform devoid of atmosphere and locks the cladding of the aluminum-boron fiber bundle to the tube 52 which prevents the possibility of random filament movement and fractures during subsequent process steps.

The preform 55 created in preform die 54 is then fed past a resistance heater 56 and into a multiple orifice drawing die 58. Heater 56 is properly sized to heat the preform to a temperature of about 1,000°F and the drawing die 58 has a plurality of successively smaller orifices similar to the orifices of preformed die 54 so that the preform may be successively drawn in a heated condition to improve its mechanical properties. Drawing is accomplished by means of a gear operated hoist 60 which is attached through chain means 62 and a chain clamp assembly 64 to the end of the rod member. Thus, by turning crank 61 a force is applied to preform 55 to drawn the preform through die 58. Both dies 54 and 58 are transversely moveable with respect to the longitudinal axis of tube 52 and preform 55, respectively, whereby a plurality of successively smaller orifices may be presented in register with the tube 52 and preform 55, respectively as can be seen from FIG. 9A, a partial sectional view of die 58 along lines A-A in FIG. 9. The preferred embodiment of preform 55 comprises thirty-seven individual aluminum-clad filament having a diameter of 0.0056 inches each which are inserted into an aluminum tubing having an internal diameter of 0.066 inches and an external diameter of 0.093 inches.

FIG. 10 discloses a machine for preparing mats of metallic-clad filaments. In FIG. 10 a single metal-clad filament 66 is wound upon the take-off spool 68. Filament 66 is fed from the take-off spool 68 over pulley 70 and through tension metering device 72 to a mat take-up spool 74. Pulley 70 adjusts the tension on filament 66 by means of a brake 71 and linkage system 73 connected to take-off spool 68, the greater the braking action on take-off spool 68, the greater will be the tension on filament 66. The forward end of filament 66 is wound upon mat take-up spool 74 by means of motor 76 and belt and pulley system 78. Further, the mat is formed upon mat take-up spool 74 by the traversing lead screw mechanism 80 which drives filament 66 parallel to the axis of rotation of mat take-up spool 74.

As is best seen in FIG. 11, lead screw 80 may be designed in such a manner as to wind a given number of filaments in a closely spaced fashion and then wind a given filament at a significant distance from the closely spaced group. This pattern is repeated across the full axial length of mat take-up spool 74 to create multiple ends on one spool whence the odd filaments are severed as by shear blade assembly 82 shown in FIG. 11. Alternatively, a multi-layer mat may be produced by completely winding filament 66 across the width of spool 74, to form a mat, adhering this mat to spool 74 in the area of radial slot 73 and which extends axially along the width of spool 74 and is arranged at the circumference of the spool, severing the mat in and along the mat and continuing to wind subsequent layers upon the first layer.

A multiple layer mat may also be formed by winding a single layer mat on a large diameter spool in the manner described above and folding this mat transversely to the axial direction of the filaments therein.

Finally, a multi-layer mat may be formed by winding a single layer mat on an extra wide spool in the manner described above and folding this mat parallel to the axial direction of the filaments therein.

Turning to FIG. 12, it is seen that ends 84 of the plurality of multi-clad filaments shown in FIG. 11 may be passed through a collimating guide 86 which draws the filaments together into a single mat and then through a plurality of guide rolls 88 and at least one subsequent guide means 90 having a slot-shaped guide to form a mat 92. The mat 92 is then sprayed in adhesive spray unit 94 and the adhesive dried in drying unit 95 whence the mat is wound upon a mat spool 96.

Referring to FIG. 13, a plurality of mat spools 96 are placed end-to-end and co-axially mounted for rotation whereby a plurality of mats 97 may be fed through subsequent collimating guide 99. Collimating guide 99 then arranges mats 92 to form a multi-layered ribbon 98. To each side of ribbon 98, sheath guide rolls 100A and 100B add a sheath 102A and 102B, respectively, of the material identical to the cladding material. Then the series of forming rolls 104, 106 and 108 gently deform the adhesively-bounded and sheathed mats as shown by the revolved views adjacent each set of rollers to form a preform 110 having a desired cross sectional shape, in this case a hat section.

The preform 110 then passed through an adhesive removing unit where the adhesive applied at adhesive spray unit 94 is removed by a suitable chemical process so that preform 110 contains only Aluminum and Boron and finally the preform passes through a resistance furnace 114 and between at least one set of opposed forming rolls 116a and 116b which can be seen in cross section in FIG. 14.

It is noted that the rolls 116a and 116b are shaped to close the edges of the sheaths and it is further noted with reference to this Figure that while only a single layer is shown plural layers are, in fact, molded into a single composite.

A tubular composite may be formed from the multi-layer mat 98 produced by the elements leading up to and including guide 97 and described above. In the embodiment shown in FIG. 15 the mat 98 passes through guide rollers 99a and 99b and then is folding into a tubular form 119 by mat folding fixture 118 and then tubes 120 and 122 of Aluminum are disposed within and without form 119, respectively. The preform 123 created by sheathing form 119 is then passed through guide rollers 124a and 124b into a tubular split die 126 which compresses preform 122 by opposing the ball 128 which is disposed within die 126. The die 126 and ball 128 may best be seen in FIG. 16.

Many changes and modifications in the above described embodiments of the invention can of course be made without departing from the scope of that invention. For example, the shape of rollers 104, 106 and 108 as well as rollers 116a and 116b may be changed to produce a different cross sectional form. In FIG. 17, a Z-type cross-sectional form is formed between opposing rollers 132a and 132b. While only a single layer is shown, it should be understood that multi-layer products are also contemplated. Accordingly, that scope is

What is claimed is:

1. A method of producing a composite material of the type having a plurality of filament integral lengths of a first material separated from each other by and bonded to a matrix of a second material comprising the steps of:

separately wrapping a strip of said second material in solid, non-molten state having a length much greater than its other dimensions about each of a plurality of filaments so that a substantial portion of the exterior surface of each of said filaments is covered by the strip wrapped about that filament, disposing a plurality of said wrapped filaments adjacent to each other in order to form a filament bundle, and applying heat to said bundle to cause consolidation into said composite material so that said second matrix material defines a matrix between adjacent filaments and uniformly spacing each filament in said composite material from adjacent filaments in said composite material.

2. A method as in claim 1 including the step of disposing said plurality of wound filaments in an array with said filaments extending substantially parallel to each other.

3. A method as in claim 1 wherein said strip is a wire.

4. A method as in claim 1 wherein said strip is foil.

5. A method as in claim 1 including the step of choosing the dimensions of said strip and filament in accordance with the desired proportion of said first material to said second material.

6. A method as in claim 1 wherein during said winding said one filament is at a temperature above the initial temperature of said matrix strip so that said matrix is heated during winding and thereafter cools so as to shrink onto said filament.

7. A method as in claim 1 wherein said matrix is a dispersion strengthened alloy.

8. A method as in claim 1 wherein said filament is a dispersion strengthened alloy.

9. A method as in claim 1 including the further step of winding a strip of said matrix of said second material having a length much greater than its other dimensions a plurality of times about a second one of said filaments, wherein said steps of winding includes the step of separating adjacent turns of said matrix strip by a given distance and including the further step of disposing said one and second wound filaments before consolidation so that the matrix on each filament is aligned with the spaces between turns on the other filament.

10. A method as in claim 1 including the step of flattening said one filament.

11. A method as in claim 1 including the step of weaving said filament with other of said plurality of wound filaments before consolidation.

12. A method as in claim 1 wherein said step of consolidating includes the step of consolidating a plurality of said wound filaments into said composite material.

13. A method as in claim 1 including the further step of winding said one wound filament about the outer circumference of a tube and wherein said step of consolidating includes the step of consolidating said wound filament and said tube into said composite material.

14. A method as in claim 1 wherein said step of winding includes the step of winding a strip of said matrix about a plurality of filament to produce a plurality of wound filaments, including the further step of disposing said wound filaments before consolidation in relation to an unwound filament so that said matrix separates said wound filaments from each other and from said unwound filament and wherein said step of consolidating includes the step of consolidating said wound filaments and said unwound filaments into said composite material.

15. A method as in claim 1 further including the step of bonding said composite material to a structural member.

16. A method for fabricating a rod-like member from a plurality of filaments of a first material clad in a second material comprising the steps of:

a. cladding filaments of said first material in said second material including separately wrapping a strip of said second material in solid, non-molten state having a length much greater than its other dimensions about each of said plurality of filaments so that at least a substantial portion of the exterior of each of said filaments is covered by the strip wrapped about that filament, b. bundling a plurality of clad filament such that the filaments are arranged in parallel and separated by the cladding to provide a compact cross-sectional bundle, c. inserting said bundle into a tube of material identical to the cladding material, d. drawing said material through at least a first die means at room temperature to lock said tube and bundle into a unitary preform, e. heating said preform, and f. drawing said preform through at least one more die means having a smaller orifice than said first die means.

* * * * *